Aug. 3, 1943.   J. W. GILLON ET AL   2,326,025
CAMERA BACK LATCH
Filed July 9, 1942

JOHN WARREN GILLON
GEORGE A. HARADEN
INVENTORS

BY

ATTORNEYS

Patented Aug. 3, 1943

2,326,025

UNITED STATES PATENT OFFICE 2,326,025

CAMERA BACK LATCH

John Warren Gillon and George Albert Haraden, Rochester, N. Y., assignors to Eastman Kodak Company, Rochester, N. Y., a corporation of New Jersey Application July 9, 1942, Serial No. 450,268

7 Claims. (Cl. 95—50)

This invention relates to photography and more particularly to a latch mechanism for holding a camera back in a set position. One object of our invention is to provide a latch which will positively hold latching elements in a position to engage slidably mounted rods regardless of their position. Another object of our invention is to provide a latch mechanism which is suitable for simultaneously positioning two different latch elements and which is so arranged that the mechanism may float as may be necessary to hold two spaced rods in a fixed position. Other objects will appear from the following specification, the novel features being particularly pointed out in the claims at the end thereof.

In many cameras a camera back carrying light-sensitive material is so constructed that it may be moved into various positions which may be necessary or desirable for producing special photographic effects. Such camera backs are usually called swing backs. In known types of cameras these swing backs may be supported at the four corners by means of rods which are slidably mounted on a support and which may have a relatively loose fit therewith so that almost any angle of the camera back can be obtained. It has heretofore been difficult to hold the camera back in a set position by latching these rods without having a separate latching mechanism for each one of the four corners, because it has been difficult to provide a latch for each of these rods which could be other than separately operated.

Our invention is particularly directed to the provision of two latching elements one of which will latch two rods, and the other of which will latch the other two rods so that to hold a camera back in a set position it is only necessary to operate two knobs.

Coming now to the drawing wherein like reference characters denote like parts throughout:

Figures 1, 2, 3, 4:
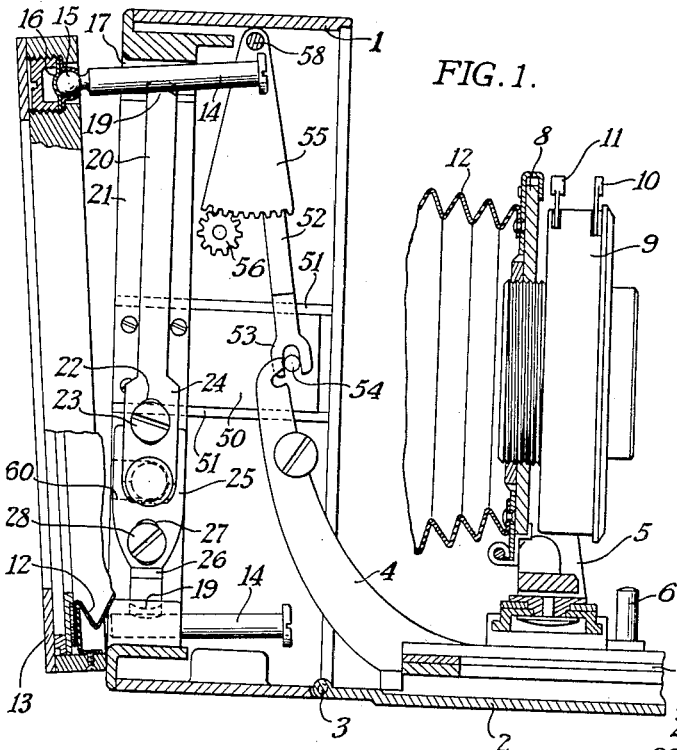
Fig. 1 is a section through a camera, parts being omitted for the sake of clarity, the camera including a latching mechanism construction in accordance with their embodying a preferred form of our invention.
Fig. 2 is a top plan view of a portion of the camera shown in Fig. 1.
Fig. 3 is an enlarged fragmentary detail in elevation showing portions of the latching mechanism.
Fig. 4 is a section taken on line 4—4 of Fig. 3.

In accordance with our invention, a pair of rods having relatively loose fit with a support may be simultaneously latched in any position which they may assume relative to the support by means of a latching mechanism operable by a knob or handle.

More specifically our invention may be applied to a camera consisting of a body portion 1 having a camera bed 2 hinged thereto at 3. Bed braces 4 are supplied for holding the bed in an open position as shown in Fig. 1 in which a lens carriage indicated broadly at 5 may be drawn out by a handle 6 on a suitable track 7.

The lens carriage 5 supports a front board 8 carrying the usual shutter 9 which may include a trigger 10 and a setting lever 11. A bellows 12 extends rearwardly from the front board 8 and may be attached to the camera back 13 which is mounted to tilt or swing with respect to the camera body 1.

The camera back 13 may include similar rods 14 at the four corners thereof, each of these rods preferably including a ball 15 mounted to turn in a socket 16 carried by the camera back. Each of the rods 14 is mounted to slide through an opening 17 of somewhat larger size than the rod 14 so that the rod has a loose fit therewith.

As best shown in Figs. 3 and 4, the rods 14 are slidably mounted in bearings 17. The bearings 17 supporting these rods may be slotted at 18 to permit a latching wedge 19 to be guided to and from the rods for latching them. Each wedge 19 is carried by a separate transversely sliding latching bar.

There is an upper latching bar 20 carried by the support 21 and has, as indicated in Figs. 3 and 4, a pin and slot connection therewith. The latching bar 20 is slotted at 22 to slide about a stud 23. The latching bar 20 is provided with parallel sides 24 (Fig. 3) to slide inside of the forklike member 25 carried by the lower latching bar 26, which has also a pin and slot connection with the support 21. This pin and slot comprises a slot 27 in the latching bar through which the stud 28 passes. Thus the two latching bars 20 and 26 may slide relative to each other, and this sliding movement is accomplished by means of a cam member 30 the cam faces of which engage an upper cam surface 31 which is arcuate and which is carried by the latching bar 20 and a lower cam surface 32 which, as best shown in Fig. 3, may be straight in form and which is carried by the lower latching bar 26. Thus when the cam 30 is moved at right angles to the latching bars, they will be separated so that the wedges 19 may engage and bind the rods 14 in any set position.

However, since the rods 14 assume different angles and different positions in their slidable mounts 17, and since there is considerable lost motion between these parts, it is desirable to provide some means for compensating for this movement and for causing both wedges 19 to become effective for latching their respective rods 14 at the same time. In order to accomplish this we provide a floating support in the form of a plate 34 which is movably mounted upon the support 21 by means of two similar pin and slot connections formed by slots 35 in the plate 34 engaging the heads 36 of studs which can conveniently be threaded at 39 into the studs 23 and 28. Thus the plate 34 is permitted to move or float a short distance back and forth because of this pin and slot connection.

The plate 34 carries permanently attached thereto a nut 42 which is threaded at 43 to receive a screw 44 carrying the cam 30. The end of this screw is carried by a threaded section 45 of an adjusting knob 46, this knob being pinned at 47 so as to turn with the screw.

When the knob 46 is turned to draw the cam 30 toward the plate 34, the latch bars 20 and 26 will be separated, and as soon as the wedges 19 set themselves on their respective rods 14, they will both simultaneously be wedged into place to hold the rods 14 in a firmly adjusted position. Because of the pitch of the threaded members 43 and 44, the cam will be definitely held in any position in which it is set by the knob 46. However, by turning the knob in a reverse direction pressure on the cam is released, and the camera back can be again moved.

The support 21 carries a pair of side rails 50 which are mounted to freely slide in the tracks 51 on the camera body 1. Sliding is accomplished by the lever 52 having a fork 53 engaging a pin 54 carried on the rails 50, and since the rod 52 may be moved through the gear segment 55 and pinion 56 by means of a knob 57 on the outside of the camera, focusing can be accomplished by moving the support relative to the camera body.

The camera side walls are alike in that each carries all of the parts above described for focusing, and each of the gear segments 55 is connected to move together by a shaft 58 extending across the top of a camera.

When the support 21 moves relative to the camera body 1, the knob 46 must also move, and we therefore provide slots 60 in the side walls of the camera body 1 so that when the support 21 is moved rearwardly for focusing, the knobs can move through these slots 60.

With the latching construction described above, it is obvious that the camera back can be firmly held in any adjusted position by merely moving the back 13 until it is in the desired position and tightening the two knobs 46. Each of these two knobs 46 operates the double latching mechanism above described and simultaneously latches to the rods 14 so as to hold them in a fixed or set position. This can be accomplished regardless of the position of the support 21 relative to the camera body 1. The floating movement of the cam 30 and its operating knob 46 is such that the two wedge members operated by one knob may also adjust themselves to the proper position for simultaneously moving the wedges 19 into an operative or working position irrespective of the position of the rods 14 in their loose fitting mounts 17.

What we claim and desire to secure by Letters Patent of the United States is:

1. A latch for cameras including a support, spaced rods slidably mounted on the support, a pair of slidably mounted latching bars movable transversely of the rods, frictional latching surfaces on the latching bars adjacent the rods, cam surfaces on the latching bars facing each other, a cam for engaging said cam surfaces mounted between the cam surfaces, and a handle for moving the cam.

2. A latch for cameras including a support, spaced rods slidably mounted on the support, a pair of slidably mounted latching bars movable transversely of the rods, frictional latching surfaces on the latching bars adjacent the rods, cam surfaces on the latching bars facing each other, a cam for engaging said cam surfaces mounted between the cam surfaces, a handle for moving the cam, and a floating support for the cam and handle whereby the cam and handle may move laterally as said handle is turned to move the cam.

3. A latch for cameras including a support, spaced rods slidably mounted on the support, a pair of slidably mounted latching bars movable transversely of the rods, frictional latching surfaces on the latching bars adjacent the rods, cam surfaces on the latching bars facing each other, a cam for engaging said cam surfaces mounted between the cam surfaces, and at substantially right angles thereto, a slide supporting the cam, a cam actuating member, also carried by the slide having a threaded connection therewith.

4. A latch for cameras including a support, spaced rods slidably mounted on the support, a pair of slidably mounted latching bars movable transversely of the rods, frictional latching surfaces on the latching bars adjacent the rods, cam surfaces on the latching bars facing each other, a cam for engaging said cam surfaces mounted between the cam surfaces, and at substantially right angles thereto, a slide supporting the cam, a cam actuating member, also carried by the slide having a threaded connection therewith, said cam when operated by said threaded connection separating the latch bars, and means for guiding the frictional latching surfaces of the latching bars into contact with the rods.

5. A latch for cameras including a support, spaced rods slidably mounted on the support, a pair of slidably mounted latching bars movable transversely of the rods, frictional latching surfaces on the latching bars adjacent the rods, a frame member extending at least partially around said support and including a slot therein, means for moving the support in the frame, a knob mounted on the support and extending through the slot and outside of the frame, and means operable by said knob and engaging the latching bars for moving them into latching relationship with the spaced rods irrespective of the relative position of the support and frame.

6. A latch for cameras including a support, spaced rods slidably mounted on the support, a pair of slidably mounted latching bars movable transversely of the rods, a pin and slot connection between each transverse rod and the support, wedges on the ends of the latching bars, a guideway adjacent the wedges to direct them toward the spaced rods, a cam means for separating the latching bars, an actuating member, and a threaded connection between the cam and actuating member retaining said cam in any set position.

7. A latch for cameras including a support, spaced rods slidably mounted on the support, a pair of slidably mounted latching bars movable transversely of the rods, a pin and slot connection between each transverse rod and the support, wedges on the ends of the latching bars, a guideway adjacent the wedges to direct them toward the spaced rods, a slidable connection between the inner ends of the latching bars, facing cam surfaces on the latching bars, a cam adapted to engage said cam surfaces and movable at substantially right angles to the latching bars, and a threaded member movably mounted on the support for moving the cam.

JOHN WARREN GILLON.
GEORGE ALBERT HARADEN.